July 3, 1962 G. J. SIEZEN 3,042,750
REMOTE LISTENING AND CONTROL SYSTEM
Filed Sept. 29, 1958
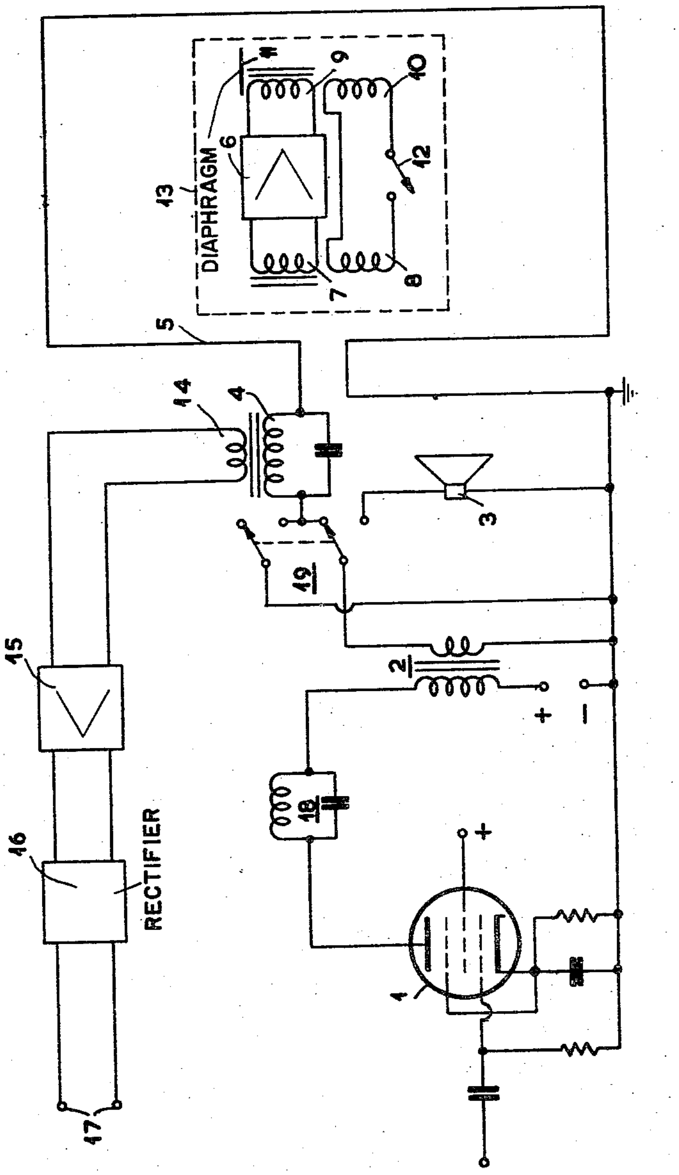
*INVENTOR*
GERRIT JAN SIEZEN United States Patent Office 3,042,750
Patented July 3, 1962

3,042,750

REMOTE LISTENING AND CONTROL SYSTEM

Gerrit Jan Siezen, Baarn, Netherlands, assignor to North American Philips Company, Inc., New York, N.Y., a corporation of Delaware Filed Sept. 29, 1958, Ser. No. 764,185
Claims priority, application Canada Nov. 27, 1957
7 Claims. (Cl. 179—2)

My invention relates to remote control systems and in particular to systems of communication using a magnetic loop and suitable magnetic pickup means wherein the pickup means is capable of supplying a signal, to the loop, which is utilized to control a particular functioning of the apparatus normally energizing the loop.

My invention comprises an apparatus having a low frequency signal amplifier adapted to energize a magnetic loop, pickup means remotely located with respect to the apparatus and responsive to the signals in said loop for acoustically reproducing signals applied to the loop, means associated with said pickup means adapted to render it regenerative to transmit a high frequency signal to said loop, tuned means in series with said loop resonant at said high frequency, and means associated with said tuned means and responsive to said high frequency signal to control a function of the apparatus having the low frequency amplifier.

In addition to the above, my invention envisages a remote control system utilizing a magnetic loop system energized by a remote transmitter whereby certain desired indications may be displayed at a central point.

In a practical embodiment of the invention, an audio signal from a television or radio receiver is transmitted by means of the magnetic loop system to remote self-powered receiving devices. According to this system, the audio output of the receiving equipment is fed by means of an output transformer to a wire loop which may be placed so as to encircle a desired listening area, for instance the loop may be located behind the baseboards of a room. The receiving device picks up audio signals from the loop, amplifies and supplies them to the ear phone wherein the signals are reconverted to sound.

In order to remotely control the television or radio receiver, means are provided on the remote receiving device to cause it to become self-oscillating at a frequency above the normal audio range. Self-oscillation may be conveniently accomplished by providing for positive feedback from the output to the input of the device. In series with the output transformer and the inducive loop is the primary winding of a control transformer which is parallel resonant to the frequency of the self-oscillation. The secondary of this transformer feeds an amplifier and rectifier system which produces the required control voltage. The secondary of the audio output transformer and the inductive loop present a very low impedance at the frequency of self-oscillation and, consequently, a high voltage is produced across the tuned primary of the control transformer. A trap circuit, tuned to the frequency of the self-oscillation, is inserted in the plate circuit of the audio output stage so as to prevent inadvertent triggering of the control circuit.

One particular advantage of my invention is the combination in one unit of a remote listening and control device with advantages of both achieved for substantially the cost of the unit.

Other advantages will become apparent as the description proceeds with respect to the FIGURE of the drawing which shows a preferred embodiment thereof.

Referring now to the drawing, the audio output stage of a television or radio receiver is shown comprising an output tube 1 to the control grid of which are supplied the audio signals. The anode of tube 1 is connected through a series circuit of a trap circuit 18 and the primary of an audio output transformer 2 to the positive side of a power supply which is indicated conventionally. The purpose of trap circuit 18 will be explained subsequently.

The secondary of output transformer 2 has one end grounded. The other end is connected through a section of a double pole double-throw switch 19 to a parallel resonant circuit 4 and an inductive loop 5 to the ground of the system or alternatively, when the position of switch 19 is reversed, through a conventional loudspeaker 3 to ground. It should be noted that resonant circuits 4 and 18 present a very low impedance to the audio frequencies in the output of tube 1.

With switch 19 in the position shown, audio currents in loop 5 produces a varying magnetic field therein. A remote receiver device, enclosed by broken line 13, is of the inductive pickup type and incorporates a coil 7 for that purpose. The audio signals picked up by coil 7 are amplified in an amplifier 6, preferably transitorized, and applied to a reproducer unit 9, 11 which may be in the form of an earphone. Diaphragm 11 has induced therein audio vibrations by means of the audio currents flowing through the iron cored winding 9.

In order that device 13 may also act as a remote control transmitter, a positive feedback circuit comprising windings 8, 10 and switch 12 is provided. Closing of switch 12 provides positive feedback from the output winding 9 to the pickup coil 7 of device 13 so that self-oscillations are produced. In the present embodiment it is desirable that the self-oscillations take place at a frequency well above the audio range produced by tube 1. This may easily be accomplished by proper selection of the feedback parameters.

The self-oscillations of device 13 produce currents at that frequency in the circuit composed of loop 5, resonant circuit 4 and the secondary of output transformer 2. Circuit 4 is tuned to the frequency of self-oscillation and substantial oscillatory currents flow therein. These currents produce a voltage in winding 14, associated with the winding of resonant circuit 4, which are amplified in amplifier 15, rectified in rectifier 16 to produce a control voltage at terminals 17. The control voltage may be utilized for any desirable purpose such as to change channels on the television receiver as by means of a stopping relay or alternatively be employed to control the position of switch 19. Switch 19 in the position opposite to that shown connects the secondary of output transformer 2 to loudspeaker 3 and simultaneously grounds one side of resonant circuit 4.

It should be noted that, regardless of the position of switch 19, self-oscillation of device 13 is effective to produce a control voltage at terminals 17.

Trap circuit 18, tuned to the frequency of self-oscillation, is effective to block any spurious oscillations in tube 1 or proceeding thereto from appearing in the secondary of transformer 2 and resonant circuit 4 thus giving rise to inadvertent production of control voltage at terminals 17.

It will be obvious that modifications of my invention may be made which do not depart from the spirit and scope thereof. It is envisaged that the circuit as described may be completely transitorized.

What is claimed is:

1. A remote control system comprising a magnetic loop, apparatus comprising a low frequency signal amplifier adapted to energize said loop, receiver means responsive to the signals in said loop, said receiver means including amplifier means, means associated with said amplifier means adapted to selectively render it regenerative to transmit a high frequency signal to said loop, tuned means in series with said loop resonant at said high frequency, and means associated with said tuned means and responsive to said high frequency signal for providing a control voltage.

2. In a remote control system, an electromagnetic wave receiver comprising an audio power output circuit, an audio transformer in said output circuit having a secondary winding, an inductive loop having a parallel resonant circuit in series therewith, an electromagnetic transducer, switch means for selectively connecting either the inductive loop or said transducer in series with said secondary winding, a remote receiving device having a pickup coil associated with said loop to receive electromagnetic energy therefrom, said receiving device including a first amplifier, switchable positive feedback means connected to said first amplifier in said remote receiving device which when activated causes said first amplifier to become self-oscillating at the frequency to which said resonant circuit is resonant, and a control voltage producing amplifier rectifier system coupled to said resonant circuit to receive energy therefrom.

3. The remote control system as claimed in claim 2 wherein said self-oscillation of the amplifier in the remote receiving device is effective to initiate production of a control voltage regardless of the circuit selection made by said switch means.

4. The remote control system as claimed in claim 2, wherein a parallel resonant circuit, tuned to the frequency of self-oscillation, is connected in the primary circuit of said audio transformer.

5. In a remote control system, a magnetic loop, an amplifier adapted to energize said loop with low frequencies, electromagnetic pickup receiver means responsive to low frequency currents in said loop, said receiver including an amplifier, means to render said amplifier regenerative at a frequency high as compared to said low frequencies, a transformer having a parallel tuned primary winding resonant at said high frequency, which is connected in series with said loop, a secondary winding inductively associated with said tuned primary winding and means associated with the secondary of said transformer and responsive to said high frequency to produce a control voltage upon the rendering of said amplifier regenerative.

6. A remote control system comprising a low frequency first amplifier, a loop, means coupling the output of said first amplifier to said loop, a remote receiving device comprising a coil inductively coupled to said loop, and a second amplifier connected to said coil for amplifying signals received by said coil, means connected to said second amplifier for selectively rendering said second amplifier regenerative whereby relatively high frequency oscillations are produced in said coil, tuned circuit means in series with said loop and tuned to the frequency of said oscillations, and control circuit means coupled to said tuned circuit means to provide a control signal output responsive to the reception of said oscillations by said loop.

7. A remote control system comprising low frequency first amplifier means, a loop, a tuned circuit connected serially with said loop, means coupled to said tuned circuit to provide an output control signal upon the reception in said loop of signals of the frequency to which said tuned circuit is tuned, a loudspeaker, switch means connected to selectively connect the output of said first amplifier means to said loudspeaker and said series connected tuned circuit means and loop, said switch means including means for completing the circuit of said tuned circuit and loop when said first amplifier means is connected to said loudspeaker, and a remote receiving device comprising a coil inductively coupled to said loop, and a second amplifier means connected to amplify signals received from said loop by said coil or to selectively render said second amplifier means regenerative whereby oscillations are produced in said coil at the frequency to which said tuned circuit is tuned.

References Cited in the file of this patent

UNITED STATES PATENTS

| | | |
|---|---|---|
| Re. 23,751 | Clark | Dec. 15, 1953 |
| 2,121,434 | Klinedinst et al. | June 21, 1938 |
| 2,515,663 | O'Brien | July 18, 1950 |
| 2,574,167 | Breisch | Nov. 6, 1951 |
| 2,596,013 | Doriot | May 6, 1952 |
| 2,654,003 | Dashiell | Sept. 29, 1953 |
| 2,853,557 | Lehman | Sept. 23, 1958 |